United States Patent
Verbrugge

(10) Patent No.: US 8,191,669 B2
(45) Date of Patent: Jun. 5, 2012

(54) VIBRATION POWER GENERATION FOR A VEHICLE

(75) Inventor: David J. Verbrugge, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 390 days.

(21) Appl. No.: 12/205,957

(22) Filed: Sep. 8, 2008

(65) Prior Publication Data

US 2010/0059301 A1 Mar. 11, 2010

(51) Int. Cl.
*B60K 8/00* (2006.01)
(52) U.S. Cl. ..................... 180/300; 180/65.31
(58) Field of Classification Search .............. 180/65.31, 180/165, 300; 363/69, 70
See application file for complete search history.

(56) References Cited

U.S. PATENT DOCUMENTS

| | | | | |
|---|---|---|---|---|
| 3,559,027 A | * | 1/1971 | Arsem | 322/3 |
| 4,624,435 A | * | 11/1986 | Freudenberg | 248/550 |
| 6,111,375 A | * | 8/2000 | Zenobi | 318/376 |
| 2004/0206561 A1 | * | 10/2004 | Song et al. | 180/165 |
| 2006/0125325 A1 | * | 6/2006 | Beaulieu | 310/12 |
| 2007/0029713 A1 | * | 2/2007 | Shin et al. | 267/140.15 |
| 2007/0089919 A1 | * | 4/2007 | de la Torre et al. | 180/65.2 |
| 2007/0107964 A1 | * | 5/2007 | Bunsmann et al. | 180/165 |

* cited by examiner

*Primary Examiner* — J. Allen Shriver, II
*Assistant Examiner* — Bryan Evans
(74) *Attorney, Agent, or Firm* — Ingrassia Fisher & Lorenz, P.C.

(57) ABSTRACT

A power generating engine mount is provided for coupling an engine and a body of a vehicle. The engine mount includes, but is not limited to a mounting stud configured for coupling to the engine and a permanent magnet coupled to the mounting stud. A coil is also provided that at least partially surrounds the permanent magnet and another mounting stud is configured to couple to the coil and the body.

7 Claims, 2 Drawing Sheets

VIBRATION POWER GENERATION FOR A VEHICLE

TECHNICAL FIELD

The technical field generally relates to power generation, and particularly relates to vibration power generation for a vehicle.

BACKGROUND

Fuel economy of vehicles is important. The automotive industry is working diligently to increase the fuel economy of vehicles by various means that include, but are not limited to: mass reduction, aerodynamics, active fuel management engines, direct injection engines, homogeneous charge compression ignition engines, and hybrid engines. However, other mechanisms and energy sources are continually sought to increase fuel economy.

It is generally known that engines vibrate during operation. The engine vibrations have been typically considered to be undesirable and significant efforts have been made to dissipate and insulate such engine vibrations from the vehicle compartment. Therefore, any energy associated with the vibration produced by the engine is currently lost through absorption or dissipation of the energy into the air, vehicle structure, or other component attached to the engine. However, the ability to capture and utilize energy associated with engine vibrations would provide a valuable energy source that can be used to increase fuel economy and the ability to harness such energy while continuing to at least partially insulate such vibrations from the passenger compartment of the vehicle would greatly benefit the automotive industry and may other vehicle industries.

Accordingly, it is desirable to provide methods for generating power for a vehicle with engine vibrations. In addition, it is desirable to provide an apparatus for generating power for a vehicle with engine vibrations. Furthermore, other desirable benefits, features, and characteristics will become apparent from the subsequent summary, detailed description, and the appended claims, taken in conjunction with the accompanying drawings and this background.

SUMMARY

In accordance with an embodiment, a power generating engine mount is provided for coupling an engine and a body of a vehicle. The mount has, among other components, a first mounting stud configured for coupling to the engine and a permanent magnet coupled to the first mounting stud. The mount also has a coil at least partially surrounding the permanent magnet and a second mounting stud coupled to the coil and configured for coupling to the body.

In accordance with another embodiment, a power generating engine mount is provided for coupling an engine with vibration during operation and a body of a vehicle. The mount includes, but is not limited to, a first means for coupling to the engine, a means for electromechanically converting the vibration of the engine into energy, and a second means for coupling the means for electromechanically converting to the body.

In yet another embodiment, a power generating system is provided for a vehicle. The system has a number of components that include, without limitation, an engine emitting a vibration during operation, engine mounts coupled to the engine, and a cradle coupled to the engine mounts. The system also includes, without limitation, a body of the vehicle coupled to the cradle. At least one the engine mounts includes, but is not limited to, a first mounting stud configured for coupling to the engine, a permanent magnet coupled to the first mounting stud, a coil at least partially surrounding the permanent magnet and a second mounting stud coupled to the coil and configured for coupling to the body.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely exemplary in nature and is not intended to limit application and uses. Moreover, there is no intention to be bound by any theory presented in the preceding background and summary or the following detailed description of the invention.

Figure 1:
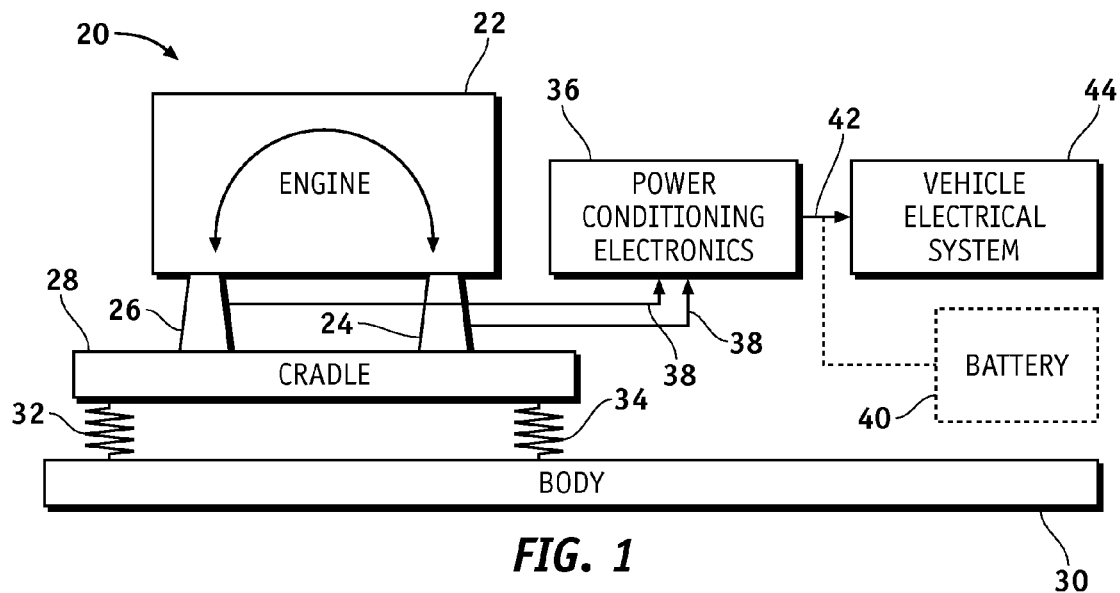
FIG. 1 illustrates a power generation system for a vehicle in accordance with an embodiment.

Referring to FIG. 1, an engine vibration power generating system 20 is illustrated in accordance with an embodiment. Generally, this system has an engine 22, such as an internal combustion engine, active fuel management engine, direct injection engine, homogeneous charge compression ignition engine, and/or a hybrid engines, that is coupled (e.g., mounted) on engine mounts 24, 26 that are coupled (e.g., mounted) on a cradle 28. The cradle 28 is coupled (e.g., mounted) on a body 30 of a vehicle (not shown) with cradle mounts 32, 34. At least one of the engine mounts 24, 26, and preferably both engine mounts 24, 26, are coupled to a power conditioner 36 and the unconditioned power 38 generated by the engine mounts 24, 26 is preferably provided to a power conditioner 36. The conditioned power 42 produced by the power conditioner 36 is utilized by one or more components or a system 44 of the vehicle.

The one or more components or system 44 unconditioned power generated by the engine mounts 24, 26, or the subsequently conditioned power 42 produced by the power conditioner 36, can be any number of vehicle components, systems, or subsystems that utilize electrical power or the vehicle system can be an energy storage device 40, such as one or more batteries, that other components or systems constantly or intermittently draw electricity for operation. The vehicle can be any number of land, water, air, and space vehicles having engines that vibrate. For example, the vehicle can be an automobile with internal combustion engine, an automobile with a hybrid engine (e.g., combination internal combustion engine and electric motor), an aircraft, ship, or spacecraft, and any one of numerous variations of these vehicle types.

In addition to applicability of the engine vibration power generating system 20 to numerous vehicle types and variations, numerous variations are available for the system 20. These variations include the addition of unlisted components, removal of listed components, and substitution of components briefly described and shown in FIG. 1. For example, additional engine mounts can be added to the system. However, at least one of the engine mounts 24, 26 is a power generating engine mount.

Figure 2:
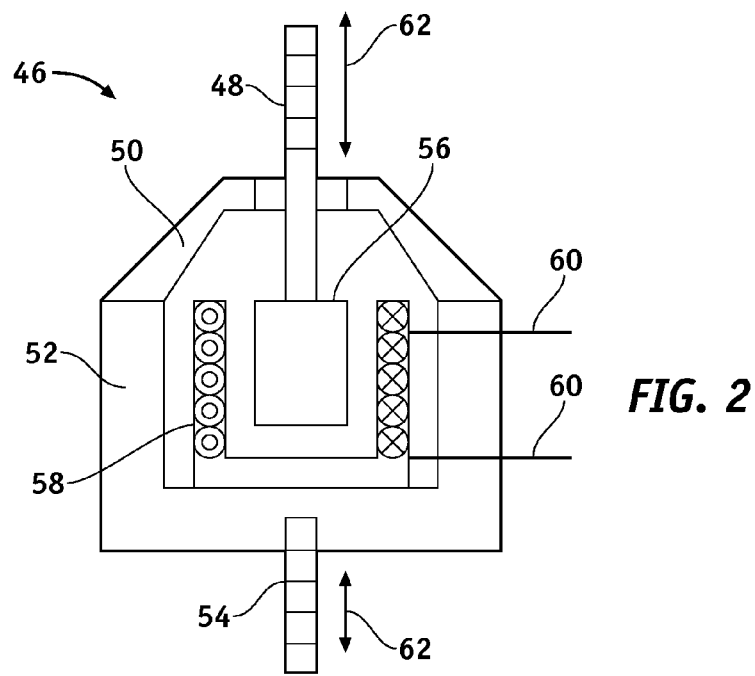
FIG. 2 illustrates the displacement converter of FIG. 1 in accordance with an embodiment.

A power generating engine mount 46 is illustrated in FIG. 2 in accordance with an embodiment. The mount 46 has, without limitation, an engine side mounting stud 48, a rubber structure 50 forming a housing with a chassis side structure 52, and a chassis side mounting stud 54. Additionally, the mount 46 has a permanent magnet 56 that is coupled to the engine side mounting stud 48 and adapted to move in relative sympathy with this stud 48. The mount is also provided with a coil 58 that remains at least substantially fixed to the chassis side structure 52. Electrical wires 60 electrically couple the coil 58 to the power conditioner 36 as shown in FIG. 1 and/or to one or more components, systems, or subsystems of the vehicle, and carry current generated by the movement of the permanent magnet 56 relative to the coil 58.

More specifically, the movement of the permanent magnet 56 relative to the coil is produced with vibration created when operating the engine. As the engine operates and vibrates, the vibration is transmitted from the engine to the engine side mounting stud that is and adapted to move in relative sympathy with this stud 48. This movement creates a displacement 62 such that the permanent magnet 56 moves with respect to the coil 58.

The movement of the permanent magnet 56 with respect to the coil 58 converts the mechanical energy provided by the engine vibration to an electrical form. This process, commonly referred to as electromechanical energy conversion, is based upon Faraday's law of electromagnetic induction that provides if a coil, which is also referred to as a winding, is linked to a varying magnetic field (i.e., the coil 58 is linked to the moving permanent magnet 56), an electromagnetic force, or voltage, electromagnetic field (emf), is induced across the coil. Therefore, the permanent magnet 56, which is an electromagnet, provides the magnetic field, which can be adjusted and set with the field intensity of the magnet, and the coil 58, which is also referred to as an armature winding or armature circuit, is where the emf induction occurs, and the associated current is carried from the coil 58 to with the electrical wires 60 for use or conditioning.

Figure 3:
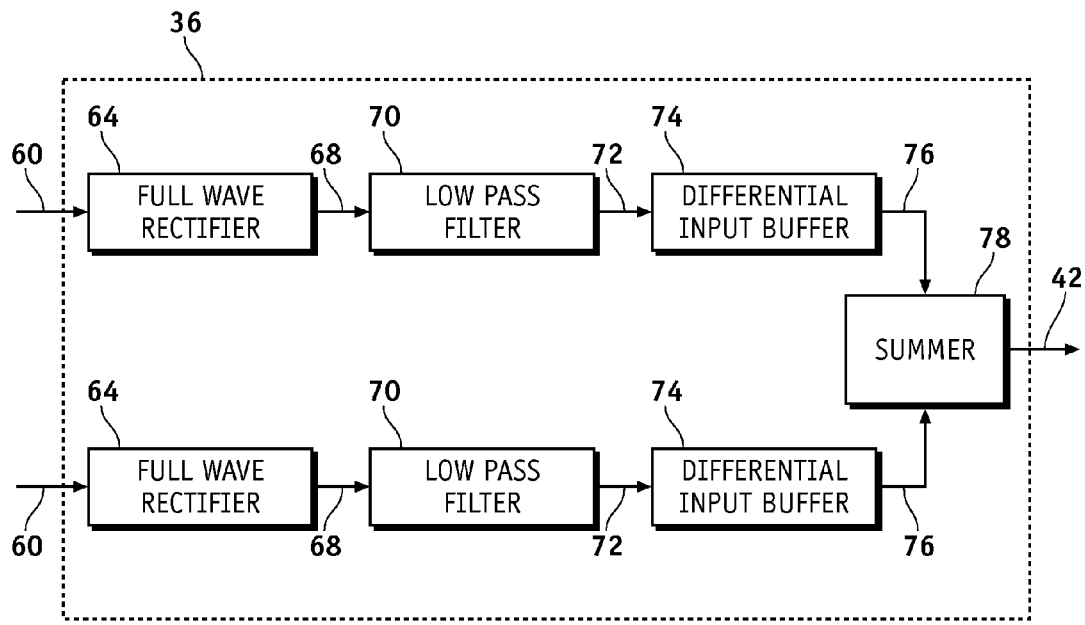
FIG. 3 illustrates the power conditioning electronics of FIG. 1 in accordance with an embodiment.
Figure 5:
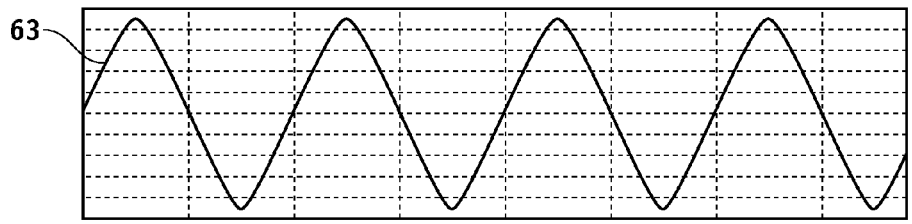
FIG. 5 illustrates an electrical waveform generated by the displacement converter of FIG. 2.
Figure 6:
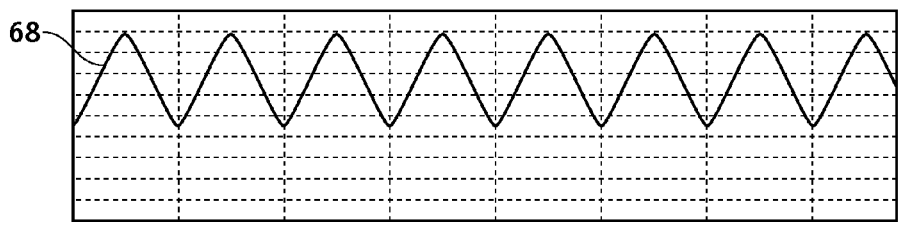
FIG. 6 illustrates an output from the full wave rectifier with the electrical waveform of FIG. 5 as an input.

FIG. 3 is the power conditioner 36 of FIG. 1 in greater detail. This embodiment of the power conditioner 36 receives the current carried from the coil 58 by the electrical wires 60, the waveform 63 of which is shown in FIG. 5. This sinusoidal waveform 63, which is a sinusoidal waveform in this example, is presented to full-wave rectifiers 64, and the full-wave rectifiers 64 generate the rectified waveform 68.

Figure 7:
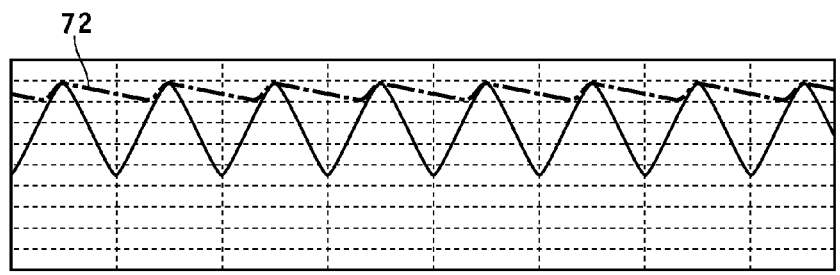
FIG. 7 illustrates the rectified waveform of FIG. 6 and a typical low pass waveform of the rectified waveform.

The rectified waveform 68 is preferably filtered by low pass filters 70 to produce the filtered waveform 72 of FIG. 7. The filtered waveform 72 from each of the low pass filters 70 is presented to differential input buffers 74, and the signals 76 from the buffer 74 are summed by summer 78 to produce the conditioned power 42.

Figure 4:
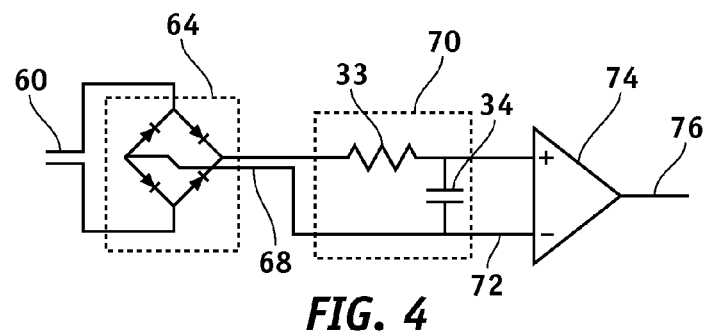
FIG. 4 illustrates the full wave rectifier/low pass filter/differential input buffer circuit of FIG. 3 in greater detail.

The summer 78, differential input buffers 74, low pass filters 70, and full-wave-rectifiers circuits can be implemented with any number of circuits. For example, the circuits shown in FIG. 4 can be used for each of these components of the power conditioner 36. In addition, other circuits and corresponding power conditioning can be can be provided by the power conditioner 36 to provide the desired waveform for the one or more components or systems utilizing this electromechanically derived energy associated with the relative motion between the engine side of the mount and the chassis side of the mount with the power generating engine mounts.

In addition to deriving energy from the vibration of the engine, the power generating engine mount 46 can be adapted to serve other purposes. For example, the mount can be adapted to at least partially reduce or dissipate transmission of vibrations from the engine to the body of the vehicle. Furthermore, the power generating engine mount 46 can be used with other mounts that do not generate power (e.g., additional mounts that do not have the permanent magnet 56, coil 58, and/or associated power conditioning.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment or embodiments of the invention, it being understood that various changes may be made in the function and arrangement of described elements without departing from the scope as set forth in the appended claims and their legal equivalents.

What is claimed is:

1. A power generating engine mount for coupling an engine and a body of a vehicle, the engine undergoing vibration during operation, the power generating engine mount comprising:
   a first mounting stud configured for coupling to the engine;
   a permanent magnet coupled to the first mounting stud;
   a coil at least partially surrounding the permanent magnet such that, during operation, relative movement of the coil and permanent magnet converts mechanical energy from the vibration into electrical energy;
   a second mounting stud coupled to the coil and configured for coupling to the body;
   an energy storage device coupled to the coil configured to store the electrical energy and
   a power conditioner configured for coupling to the coil wherein the power conditioner comprises
   a first full-wave rectifier coupled to a first end of the coil, the first full-wave rectifier configured to receive a first sinusoidal waveform from the coil and to produce a first rectified waveform;
   a first low pass filter coupled to the first full-wave rectifier, the first low pass filter configured to receive the first rectified waveform and to produce a first filtered waveform;
   a first differential input buffer coupled to the first low pass filter, the first differential input buffer configured to receive the first filtered waveform and configured to produce a first signal forming at least a first portion of the electrical energy;
   a second full-wave rectifier coupled to a second end of the coil, the second full-wave rectifier configured to receive a second sinusoidal waveform from the coil and to produce a second rectified waveform;
   a second low pass filter coupled to the second full-wave rectifier, the second low pass filter configured to receive the second rectified waveform and to produce a second filtered waveform;
   a second differential input buffer coupled to the second low pass filter, the second differential input buffer configured to receive the second filtered waveform and configured to produce a second signal forming at least a second portion of the electrical energy; and a summer coupled to the first differential input buffer and the second differential input buffer, the summer configured to receive the first signal and the second signal and to produce the electrical energy as conditioned power.

2. The power generating engine mount of claim 1, wherein the power conditioner is configured for coupling to a system of the vehicle.

3. The power generating engine mount of claim 1, further comprising a rubber structure coupled to the first mounting stud.

4. The power generating engine mount of claim 3, further comprising a structure coupled to the second mounting stud and the rubber structure.

5. A power generating system for a vehicle, comprising:
an engine emitting a vibration during operation;
a plurality of engine mounts coupled to the engine;
a cradle coupled to the plurality of engine mounts; and
a body of the vehicle coupled to the cradle,
wherein at least one of the plurality of engine mounts comprises:
a first mounting stud configured for coupling to the engine;
a permanent magnet coupled to the first mounting stud;
a coil at least partially surrounding the permanent magnet such that, during operation, relative movement of the coil and permanent magnet converts mechanical energy from the vibration into electrical energy; and
a second mounting stud coupled to the coil and configured for coupling to the body;
an energy storage device coupled to the coil and configured to store the electrical energy and
a power conditioner configured for coupling to the coil wherein the power conditioner comprises a first full-wave rectifier coupled to a first end of the coil, the first full-wave rectifier configured to receive a first sinusoidal waveform from the coil and to produce a first rectified waveform;
a first low pass filter coupled to the first full-wave rectifier, the first low pass filter configured to receive the first rectified waveform and to produce a first filtered waveform;
a first differential input buffer coupled to the first low pass filter, the first differential input buffer configured to receive the first filtered waveform and configured to produce a first signal forming at least a first portion of the electrical energy;
a second full-wave rectifier coupled to a second end of the coil, the second full-wave rectifier configured to receive a second sinusoidal waveform from the coil and to produce a second rectified waveform;
a second low pass filter coupled to the second full-wave rectifier, the second low pass filter configured to receive the second rectified waveform and to produce a second filtered waveform;
a second differential input buffer coupled to the second low pass filter, the second differential input buffer configured to receive the second filtered waveform and configured to produce a second signal forming at least a second portion of the electrical energy; and
a summer coupled to the first differential input buffer and the second differential input buffer, the summer configured to receive the first signal and the second signal and to produce the electrical energy as conditioned power.

6. The power generating system of claim 5, wherein the engine is a hybrid engine.

7. The power generating system of claim 5, wherein the vehicle is automobile.

* * * * *